(12) United States Patent
Busch

(10) Patent No.: US 8,491,433 B2
(45) Date of Patent: Jul. 23, 2013

(54) AUTOMATIC TRANSMISSION WITH A DRIVE AREA A HYDRODYNAMIC CONVERTER, AND A DRIVEN AREA, AND A METHOD FOR BRAKING AT HIGH SPEEDS

(75) Inventor: Jorg Busch, Konigsbronn-Zang (DE)

(73) Assignee: Voith Patent GmbH, Heidenheim (DE)

( * ) Notice: Subject to any disclaimer, the term of this patent is extended or adjusted under 35 U.S.C. 154(b) by 273 days.

(21) Appl. No.: 12/451,877

(22) PCT Filed: May 29, 2009

(86) PCT No.: PCT/EP2009/003856
§ 371 (c)(1),
(2), (4) Date: Nov. 18, 2010

(87) PCT Pub. No.: WO2009/149840
PCT Pub. Date: Dec. 17, 2009

(65) Prior Publication Data
US 2011/0077116 A1    Mar. 31, 2011

(30) Foreign Application Priority Data
Jun. 12, 2008 (DE) .......................... 10 2008 027 946

(51) Int. Cl.
*F16H 47/08* (2006.01)

(52) U.S. Cl.
USPC ................................. 475/59; 475/67; 475/71

(58) Field of Classification Search
USPC .................. 475/47, 49, 53, 54, 59, 67, 71
See application file for complete search history.

(56) References Cited

U.S. PATENT DOCUMENTS

| | | | |
|---|---|---|---|
| 2,402,164 A | 6/1946 | Kelbel | |
| 2,414,359 A | 1/1947 | Carnagua | |
| 2,997,896 A * | 8/1961 | Preston | 475/56 |
| 4,117,745 A * | 10/1978 | Yokoyama et al. | 475/53 |
| 4,229,996 A * | 10/1980 | Hildebrand | 475/55 |
| 5,030,178 A | 7/1991 | Ming-Luen | |
| 5,557,977 A * | 9/1996 | Stockton | 74/15.84 |

FOREIGN PATENT DOCUMENTS

| | | |
|---|---|---|
| DD | 101 209 | 10/1973 |
| DE | 1 032 109 | 6/1958 |
| DE | 1 064 824 | 9/1959 |
| DE | 1 167 145 | 4/1964 |
| DE | 1 178 714 | 9/1964 |
| DE | 1 181 072 | 11/1964 |
| DE | 1 214 967 | 4/1966 |
| DE | 1 625 173 | 12/1969 |
| DE | 2 021 543 | 11/1971 |
| DE | 25 13 570 | 10/1975 |
| DE | 27 43 583 | 4/1979 |
| DE | 34 15 909 | 10/1985 |
| DE | 691 10 367 | 3/1996 |
| DE | 197 51 776 | 5/1999 |
| DE | 198 02 285 | 7/1999 |
| DE | 10 2006 023 528 | 11/2007 |
| FR | 1.325.887 | 5/1963 |

\* cited by examiner

Primary Examiner — Justin Holmes
(74) Attorney, Agent, or Firm — Farjami & Farjami LLP

(57) ABSTRACT

An automatic transmission is provided, which has a drive area, a hydrodynamic converter, and a driven area. In such a transmission, there are power paths via both the hydrodynamic converter, purely mechanical power paths around the hydrodynamic converter and combined power paths. It is provided in accordance with the invention that precisely one planetary gear set is provided in the driven area. A braking means is further provided which is suitable for tightly holding the turbine of the hydrodynamic converter.

8 Claims, 3 Drawing Sheets

AUTOMATIC TRANSMISSION WITH A DRIVE AREA A HYDRODYNAMIC CONVERTER, AND A DRIVEN AREA, AND A METHOD FOR BRAKING AT HIGH SPEEDS

This is a U.S. national phase application which is based on, and claims priority from PCT application Serial No. PCT/EP2009/003856, filed on May 29, 2009, which claims priority from foreign application Serial No. DE 102008027946.3, filed on Jun. 12, 2008 in Germany.

The invention relates to an automatic transmission with power paths both via the hydrodynamic converter, purely mechanical power paths around the hydrodynamic converter, and also combined power paths. The invention further relates to a method for braking at low speeds with such an automatic transmission.

Generic automatic transmissions are generally known. Reference is hereby made by way of example to DE 20 21 543 A1, which describes a combined hydrodynamic/mechanical transmission for vehicles with division of the traction power by means of a differential on a power path with a hydrodynamic converter and a mechanical power path which is parallel thereto and the joining of the traction power to a common power path. The transmission comprises mechanical speed steps (gears) which can optionally be switched on and off in the hydrodynamic and/or mechanical and/or common power path.

These so-called differentials are used in the drive of various kinds of vehicles. Several planetary gear sets are used in the differential, as is usually the case in all automatic transmissions. These planetary gear sets are connected with each other in a predetermined fixed coupling schema. The various speed steps of the transmission are realized with multi-disk clutches and multi-disk brakes. It is typically ensured with the disks of the clutches and brakes that shifting occurs without any interruptions in the tractive power.

The numerous known advantages of the differentials are offset by the high complexity of the components in the form of planetary gear sets and multi-disk clutches and multi-disk brakes.

From the German published examined application DE-A-1 1064 824 an automatic transmission with a torque divider is known in which the driven area arranged in the direction of the power flow after the hydrodynamic converter merely comprises one planetary gear set. It also allows a very compact arrangement of the automatic transmission.

It is the object of the present invention to improve an automatic transmission in the respect that an optimization is achieved concerning the required overall space and an optimization concerning the possible functionalities.

This object is achieved in accordance with the invention by the features mentioned in the claims.

The arrangement in accordance with the invention with only one planetary gear set in the driven area of the automatic transmission allows arranging this driven area in a considerably more compact way than was previously the case in such automatic transmissions with torque dividers which comprise at least two planetary gear sets in the driven area.

A braking means is further provided in accordance with the invention which is suitable for holding tight the turbine of the hydrodynamic converter. When the power take-off is connected with the ring gear, an additional forward gear with high speed-increasing ratio (a so-called "overdrive") can be achieved by tightly holding the turbine of the hydrodynamic converter. With such an arrangement of the invention it is possible to achieve a very compact arrangement of the driven area with only one planetary gear set and an additional turbine brake, which in addition to its compact configuration allows an additional gear with "increased speed".

The especially compact and simple arrangement of the automatic transmission in the driven area is achieved by waiving the possibility of realizing a wear-free brake only via the converter of the differential.

In a respective advantageous embodiment of the invention it is possible to provide a separate wear-free sustained-action brake which is separate from the converter. Such a brake which can be arranged either as a primary or secondary retarder allows keeping the total required overall space of transmission and sustained-action brake smaller in parallel arrangement to the transmission than would be the case in an arrangement according to the state of the art with two planetary gear sets in the driven area of the automatic transmission.

It can be provided in a further, especially advantageous embodiment of the invention that the sun gear of the planetary gear set is connected with the converter, with braking means being provided for tightly holding the ring gear and with clutch means being provided for connecting the ring gear on the one hand or the planet carrier on the other hand with the power take-off.

This arrangement allows producing via the clutch and braking means a connection of the power take-off via the converter on the one hand and directly via the planet carrier on the other hand with the drive area of the automatic transmission. In the case of a ring gear which is braked in relation to the housing of the transmission it is thus ensured that the force coming from the drive area of the automatic transmission reaches via the hydrodynamic converter on the one hand and a mechanical transmission on the other hand from the input of the transmission to output. This configuration typically corresponds to the first gear and allows moving off by using the hydrodynamic converter. The braking means is not released for the further gears, so that the force is transmitted by circumventing the converter. For further setting the gear ratio (gears), a change in the coupling structure of the elements of the drive area is then made in the known and usual manner.

A further clutch means and/or braking means is provided in a further embodiment, which is arranged for tightly holding the planet carrier in relation to the housing of the transmission.

When this clutch means is actuated and the power take-off is connected with the ring gear of the planetary gear set in the driven area simultaneously with the other clutch means, a power transmission occurs with a reversal of the direction of rotation after the hydrodynamic converter. The transmission thus comprises a reverse gear that can be shifted very easily.

According to a very advantageous further development of the invention, the clutch means are arranged as claw clutches. Such claw clutches offer considerable advantages with respect to the overall space and the production costs as compared with the multi-disk clutches conventionally used in automatic transmissions. Since they make do without any disks which rub against one another during operation, they further allow an improvement in the efficiency of such an automatic transmission. Since a change in the coupling structure is primarily necessary during the shifting into reverse gear as already explained above, the non-load shifting which is typically the disadvantage of claw clutches does not represent a disadvantage in this case.

In an especially advantageous further development of this idea, synchronization means can be provided at least for a part of the claw clutches.

These synchronization means are especially decisively advantageous when shifting into the additional gear ("overdrive") is concerned, as already mentioned above. Since sufficient kinetic energy is typically available from the drive of the vehicle during shifting to such a fast gear, the non-load shifting here does not represent any disadvantage worth mentioning. As a result of the synchronization, which is provided either in a suitable area of the transmission or in the area of the coupling elements directly, this non-load shifting process can then occur in a synchronized manner and thus very rapidly.

The invention further provides a method for braking with an automatic transmission in accordance with the invention. For this purpose, merely the ring gear of the planetary gear set is tightly held via suitable braking means, especially multi-disk brakes, in the second, third or fourth gear without changing the coupling structure of the planetary gear set in the driven area. This leads to the introduction of a moment in the area of the turbine of the hydrodynamic converter which causes a braking effect analogously to a retarder.

In order to amplify the braking at respectively low speeds as occur in the first and second gear for example, or in "overdrive", a separate retarder or a separate wear free sustained-action brake can be provided, as already mentioned above.

Further advantageous embodiments of the invention arise from the remaining sub-claims and are illustrated by reference to the embodiment which is explained below in an exemplary way by reference to the drawings, wherein:

Figure 1:
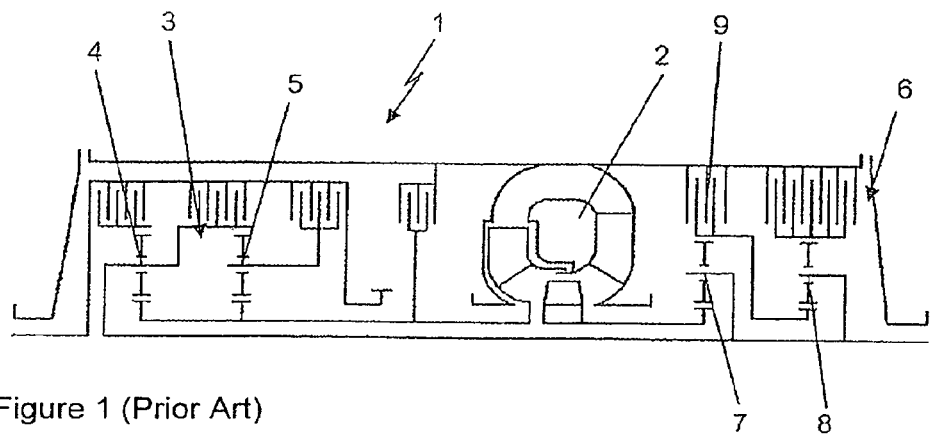
FIG. 1 shows a schematic illustration of a differential according to the state of the art.

FIG. 1 shows a differential 1 as a typical example for a generic automatic transmission in accordance with the state of the art. A hydrodynamic convertor 2 is shown in the middle. In the illustration according to FIG. 1, to the left of the hydrodynamic converter, the drive area 3 is shown which in the illustrated case comprises the usually provided planetary gear sets 4 and 5. In FIG. 1, to the right of the hydrodynamic converter, the driven area 6 is shown which also comprises two planetary gear sets 7, 8 in accordance with the state of the art. The arrangement according to FIG. 1 is the currently usual arrangement of a differential, in which the converter is used for the first forward gear, the reverse gear and as a wear-free sustained-action brake or retarder. The disadvantageous aspect in such transmissions is that during braking, and especially during braking at high speeds, there is a high load on the converter 2 which leads to a high noise emission of the transmission. Moreover, the converter 2 cannot be optimized respectively for braking or moving off because it needs to fulfill both functions.

Figure 2:
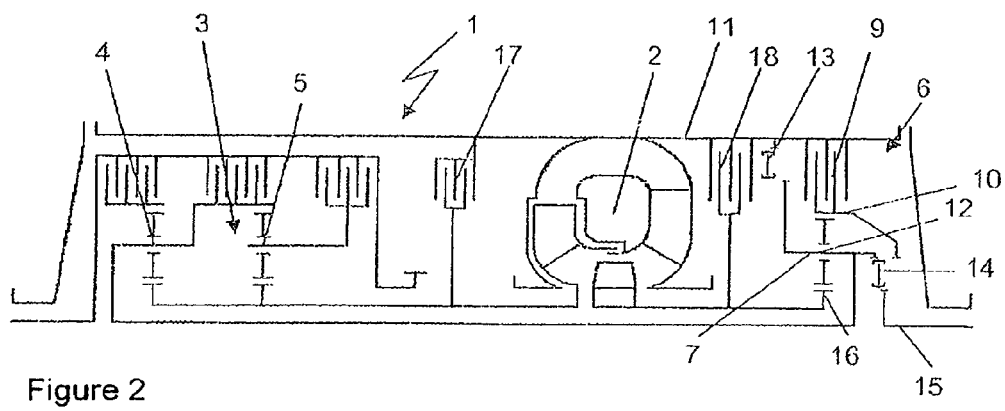
FIG. 2 shows a differential according to the invention in a first embodiment.

This is remedied by the novel transmission as shown in the illustration according to FIG. 2. It also concerns a differential 1 which comprises the characteristic converter 2. The drive area 3 is also situated in this illustration according to FIG. 2 to the left of converter 2, which drive area can also be arranged in analogy to the state of the art. The drive area does not play any further role for the present invention, so that the drive area will not be discussed any further.

The driven area of the novel transmission 1 is situated on the right side of the converter 2 in FIG. 2, as in the state of the art. This driven area 6 now only comprises one planetary gear set 7, whereas the second planetary gear set 8 which is known from the state of the art can be omitted entirely. In analogy to the state of the art, the driven area 6 also comprises a multi-disk brake 9 with which the ring gear 10 of the planetary gear set 7 can be braked in relation to a housing 11 of transmission 1 when required. The planet carrier 12 of the planetary gear set 7 can be connected via a clutch 13 with the housing 11 of the transmission 1. The power take-off 15 of the transmission 1 can be connected by means of clutch 14 with the ring gear 10 or planet carrier 12. In contrast, the sun gear 16 of the planetary gear set 7 comprises a fixed connection with the turbine of the converter 2.

Figure 6:
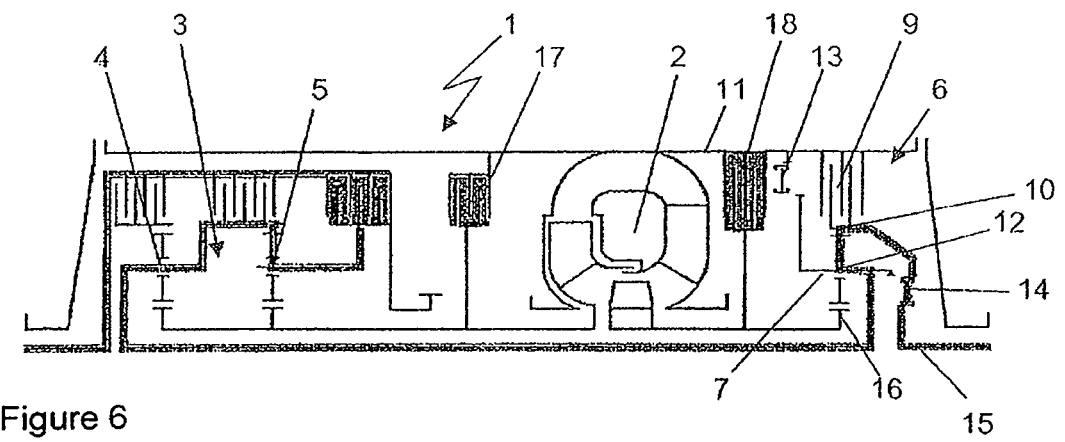
FIG. 6 shows the power flow in the overdrive in a transmission in an alternative embodiment.

In addition, the driven area 6 further comprises a multi-disk brake 18. The sun gear 16 can be braked in relation to the housing 11 of transmission 1 by using this further multi-disk brake 18. A further speed-increasing ratio can be achieved as a result of the connection of the planet carrier 12 with the drive area 3 with simultaneous connection of the non-braked ring gear 10 with the power take-off 15 via the claw clutch 14. This further gear with speed-increasing ratio whose power flow is shown in FIG. 6 is typically designated as an overdrive.

Figure 3:
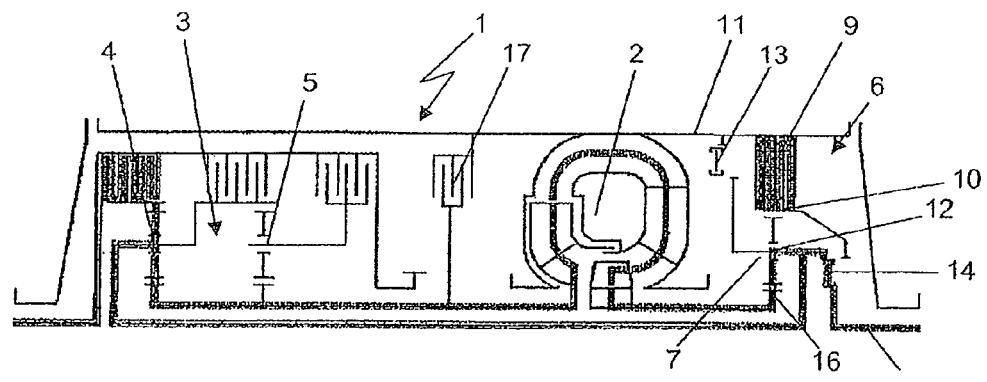
FIG. 3 shows the power flow in the transmission in accordance with the invention in the first gear.
Figure 4:
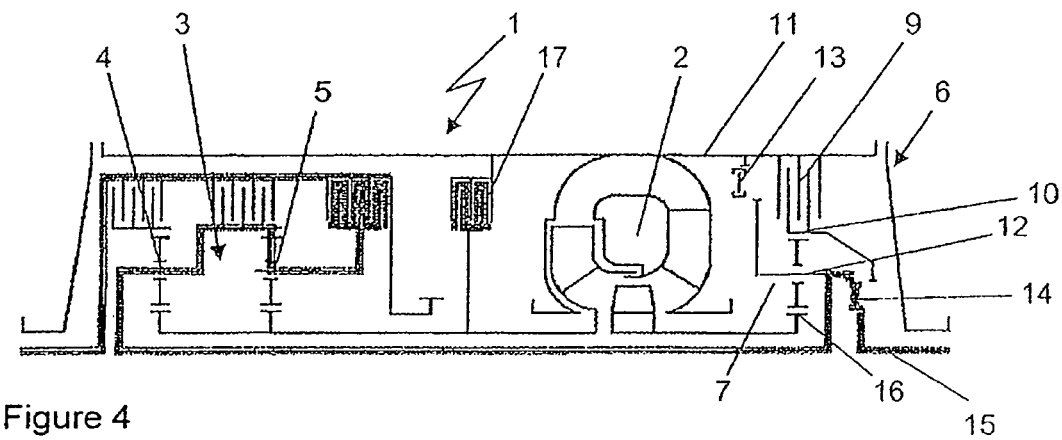
FIG. 4 shows the power flow in the transmission in accordance with the invention in the fourth gear.

With such a transmission, all conventional forward gears, without the overdrive, can be shifted as in the transmission according to the state of the art because for continued shifting of the individual gears it is typically only necessary to make a change of the coupling structure of elements of the drive area 3 and the multi-disk brake 9 of the differential 1. The following FIGS. 3 and 4 show two forward gears with the associated power flow by way of example. The illustration of the further multi-disk brake 18 was omitted in FIGS. 3, 4 and 5 for reasons of simplicity of the illustration, which brake is always held open in this case. The further multi-disk brake 18 is shown in the illustration of the power flow for the overdrive itself, as shown in FIG. 6.

FIG. 3 shows the first gear, in which the moment is divided accordingly in the drive area 3 of the transmission 1, so that a part of the power flow reaches the driven area 6 via the hydrodynamic converter 2, whereas another part reaches the area of the planet carrier 12 in the driven area by direct mechanical way. When said planet carrier 12 is coupled via the clutch 14 with the power take-off 15, driving in the first gear is possible, with the ring gear 10 of the planetary gear set 7 being tightly held in the driven area via the multi-disk brake 9 on the housing 11 of the differential 1. FIG. 4 shows the fourth gear, in which the coupling structure of the planets 4, 5 in the drive area 3 is changed and the turbine is braked simultaneously via a multi-disk brake 17 and the hydrodynamic converter is thus deactivated. The planet carrier 12 of the planetary gear set 7 is connected with the power take-off 15 in this gear too (as also in the second and third gear) via a respective shifting of the claw clutch 14.

Figure 5:
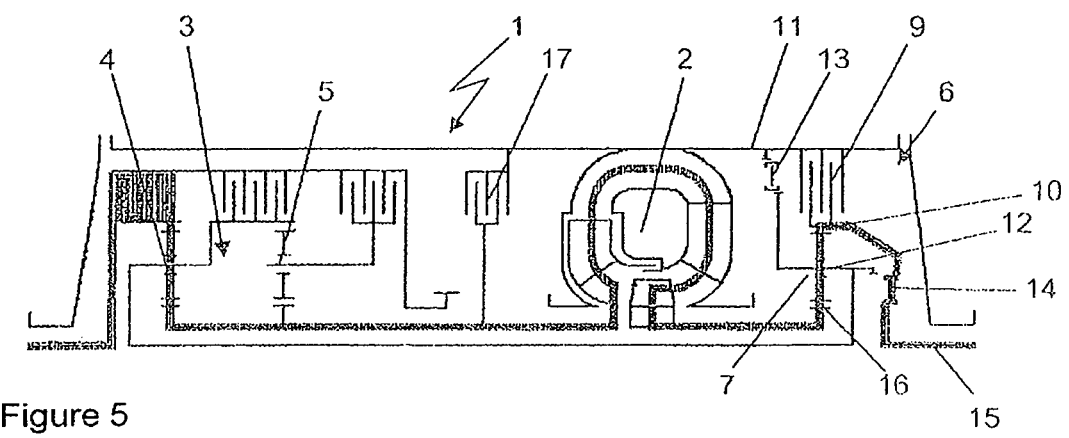
FIG. 5 shows the power flow in the transmission in accordance with the invention in the reverse gear.

FIG. 5 shows the power flow in the reverse gear. It corresponds in the drive area 3 to the first gear in the coupling of the individual elements. By connecting the power take-off with the ring gear 10 via the clutch 14, a simultaneous release of the ring gear 10 via the multi-disk brake 9 and tightly holding the planet carrier 12 via the clutch 13, there is a power flow with reversed direction of rotation on the power take-off, so that the transmission will run in the reverse gear via the converter 2. Since a shifting from forward gear to reverse gear typically occurs without load anyway, the use of the simple, small and sturdy working claw clutches does not represent any relevant disadvantage over the use of multi-disk clutches, which would also be possible in this case. Through the small, sturdy and cost-effective claw clutches it is possible to achieve a shifting over to the reverse gear without continuous frictional forces occurring during the operation as in the case of multi-disk clutches which would have an adverse effect on the efficiency of the transmission. The only alleged disadvantage of arranging the driven area 6 of the transmission 1 in this way is that there is no longer any coupling structure which allows braking with the converter 2 at low output speeds of the first and second gear. As a result of the reduction in overall space and the omission of one planetary gar set in the driven area 6, such an amount of complexity is lost and so much overall space is saved that an additional retarder which is additionally arranged separately from the converter 2 or any other suitable kind of wear-free sustained-action brake (not shown) can be used very easily. Moreover, the omission of braking at high speeds and the use of a separate retarder offer the possibility to arrange the hydrodynamic converter 2 ideally for driving operation because it is no longer necessary to make a compromise between driving and braking any more. Further advantages can thus be achieved.

The separate wear-free sustained action brake can be arranged both as a primary retarder which therefore runs with the speed of the drive area and as a secondary retarder which runs with the speed of the power take-off for example. All kinds of wear-free sustained action brakes are principally possible, e.g. an eddy current brake, a hydrostatic brake, a water retarder or an electromotive retarder which can be operated in a recuperative manner as a generator during braking in order to feed back electric power into an onboard network or an energy storage device. It shall finally be noted that this list of possible retarders shall be understood merely as being exemplary, with a secondary retarder being certainly preferable for reasons of loading and the speeds, and it does not make any claims to completeness.

As a result of the omission of the braking effect at low speeds of the power take-off of the first and second gear, the possibility is offered to choose the planetary gear set in a very free manner in respect of its configuration. This also provides advantages concerning the force and power flows in the transmission. Furthermore, the decoupling of the mechanical power train during reverse travel leads to an elimination of the wattles power, which also has a positive effect on the efficiency of the transmission and the loads on the components.

However, converter 2 can further be used to achieve a braking effect at high speeds of the third and fourth gear for example. For this purpose, merely the ring gear 10 is tightly held via the multi-disk brake 9 in relation to the housing 11 without any change of the coupling structure of the planetary gear set 7. This leads to an introduction of power in the area of the turbine of the hydrodynamic converter 2 which causes a braking effect in analogy to a retarder. A respective purposeful configuration of the convertor 2 for this braking is not necessary however.

Figure 7:
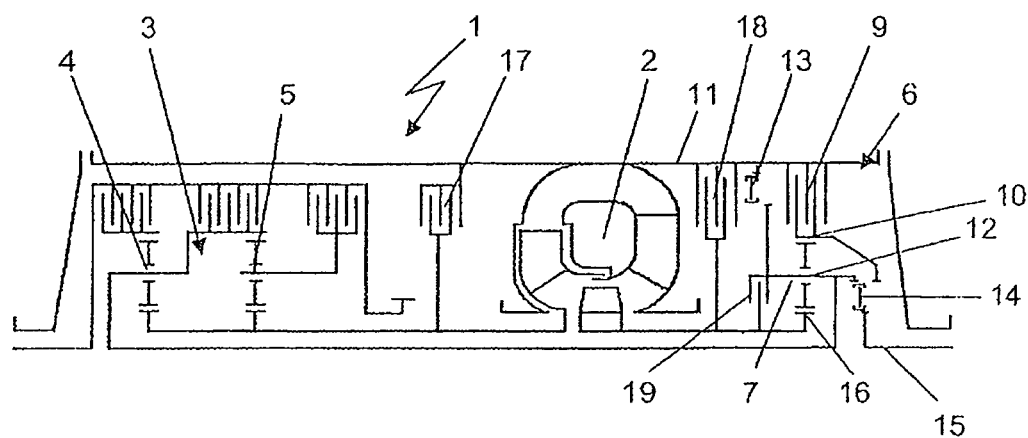
FIG. 7 shows the transmission in accordance with the invention in a further alternative embodiment.

As already mentioned, FIG. 6 shows the power flow in the overdrive. In such a gear, which is used at high speeds, the shifting under load which is typical for automatic transmissions does not play any decisive role. Since there are high speeds and thus a high amount of drive on the part of the drive train and/or the vehicle, it is possible to shift in a load-free manner with claw clutches without this being regarded as a relevant disadvantage. In order to further improve load-free shifting however, synchronization means 19 can be provided which are either integrated directly in the claw clutch 14 or, as indicated in FIG. 7 in an exemplary way, are provided separately from the claw clutch 14 at suitable locations in transmission 1. Such synchronization means allow short start synchronizing during shifting into the overdrive, so that it can be shifted quickly and precisely, even when load-free shifting with the claw clutch 14 is used here in contrast to the type otherwise used in automatic transmissions.

The synchronization in/for the clutch 14 can also be arranged in an especially simple way or even be omitted when the multi-disk clutch 18 is closed only after or during the claw shifting. The adjustment of speed in the input area and the motor is then made by the multi-disk clutch 18. Moreover, speed adjustment of the claw clutch can also be achieved by feedback control of the motor. The mechanical synchronization can thus be achieved in an especially simple way, or can even be omitted.

Figure 8:
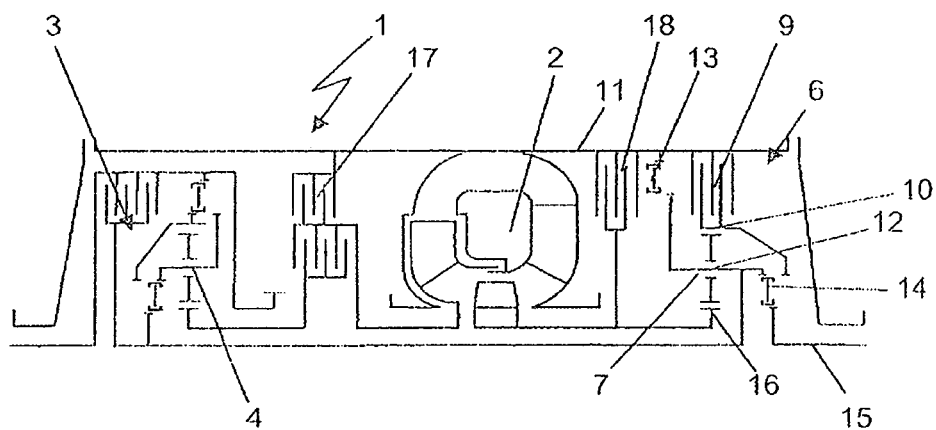
FIG. 8 shows the transmission in accordance with the invention in the alternative embodiment with additionally optimized input area.

A further, very advantageous embodiment of a differential 1 is shown in FIG. 8. The change in comparison with the embodiments as explained up until now does not lie in the area of the power take-off 6, but in the area of the drive 3. This drive area 3 is arranged in a very compact manner, in which the coupling structure of a planetary gear set 4 is always changed when it revolves in a load-free manner in its entirety. The embodiment shown in FIG. 8 is only one of various possibilities which are described especially in closer detail in the German patent application DE 10 2008 010 064.1. Extremely compact differentials 1 can be built with those two possibilities of the mentioned German application for optimizing the drive area 3 of transmission 1 and the variant as explained herein for optimizing the driven area 6 of the transmission. In the embodiment as shown in FIG. 8, an extremely compact five-gear transmission can be achieved with a total of merely two planetary gear sets with four gears of the drive area 3 and one additional overdrive of the driven area 6.

The invention claimed is:

1. An automatic transmission, comprising a drive area, a hydrodynamic converter, and a driven area, with power paths being provided via both the hydrodynamic converter, purely mechanical power paths around the hydrodynamic converter and combined power paths, with precisely one planetary gear set being provided in the driven area, characterized in that a braking means is provided which is suitable for tightly holding the turbine of the hydrodynamic converter, with a sun gear of the planetary gear set being connected with the converter, with braking means for tightly holding a ring gear being provided, and with clutch means being provided for connecting the ring gear on the one hand or a planet carrier of the planetary gear set on the other hand with the power take-off.

2. A method for braking at high operating speeds with the automatic transmission according claim 1, characterized in that for braking at low speeds the ring gear of the planetary gear set is tightly held while the planet carrier is simultaneously connected with the power take-off.

3. The automatic transmission according claim 1, characterized in that the clutch means are arranged as claw clutches.

4. The automatic transmission according to claim 3, characterized in that synchronization means are provided for at least a part of the claw clutches.

5. The automatic transmission according claim 1, characterized in that clutch and/or braking means are provided for tightly holding the planet carrier in relation to a housing of the transmission.

6. The automatic transmission according claim 5, characterized in that the clutch means are arranged as claw clutches.

7. The automatic transmission according to claim 6, characterized in that synchronization means are provided for at least a part of the claw clutches.

8. A method for braking at high operating speeds with the automatic transmission according claim 5, characterized in that for braking at low speeds the ring gear of the planetary gear set is tightly held while the planet carrier is simultaneously connected with the power take-off.

\* \* \* \* \*